United States Patent [19]
Ishibashi et al.

[11] Patent Number: 5,841,409
[45] Date of Patent: *Nov. 24, 1998

[54] IMAGE DISPLAY APPARATUS

[75] Inventors: Kenji Ishibashi, Izumi; Yasushi Tanijiri, Sakai; Yasumasa Sugihara, Hashimoto, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 633,167

[22] Filed: Apr. 16, 1996

[30] Foreign Application Priority Data

Apr. 18, 1995 [JP] Japan .................................. 7-092747
Jun. 12, 1995 [JP] Japan .................................. 7-144488
Jun. 12, 1995 [JP] Japan .................................. 7-144490

[51] Int. Cl.$^6$ .................................................... G09G 5/00
[52] U.S. Cl. ................................................... 345/8; 345/7
[58] Field of Search .................... 345/7, 8, 9; 348/53; 359/13, 630; 350/142, 143, 148, 149

[56] References Cited

U.S. PATENT DOCUMENTS 2,956,156 10/1960 Heilig .
4,722,601 2/1988 Mcfarlane ................................ 345/8
5,343,313 8/1994 Fergason ................................. 348/8
5,388,990 2/1995 Beckman ................................. 345/8
5,491,510 2/1996 Gove ...................................... 345/8

FOREIGN PATENT DOCUMENTS 5-78013    12/1983  Japan .
62-115989   5/1987  Japan .
5-52116     5/1991  Japan .
3-289797 (A) 12/1991 Japan .

Primary Examiner—Matthew Luu
Attorney, Agent, or Firm—Burns, Doane, Swecker & Mathis, LLP

[57] ABSTRACT

An HMD is provided with two piezoelectric vibrating gyros which detect vertical and horizontal angular velocities, and a horizontal sensor which detects a vertical angle. While the user's head rotates, shooting direction of a three-dimensional camera is varied in accordance with the angles obtained by integration of the detected angular velocities. While the head is stationary, the obtained vertical angle and the output of the gyro is corrected based on the angle detected by the horizontal sensor. The shooting direction of the camera can be manually set irrespective of the direction of the head, and information on the viewing direction is displayed together with a taken image.

19 Claims, 16 Drawing Sheets

IMAGE DISPLAY APPARATUS

BACKGROUND OF THE INVENTION

1. Field of the Invention

The present invention relates to an image display apparatus, in particular, a head mounted display (HMD) worn by the user on his or her head to view images displayed before the eyes, and more specifically, to an HMD having a function to detect a movement of the head of the user wearing the HMD.

2. Description of the Prior Art

In a system to view images taken by a three-dimensional camera with a three-dimensional viewing apparatus, it has been proposed to vary the direction of the three-dimensional camera according to the viewing direction of the three-dimensional viewing apparatus to obtain more realistic images. For example, Japanese Laid-open Patent Application No. H3-56923 discloses to control the direction of the three-dimensional camera according to the direction of the HMD.

On the other hand, as an angular velocity sensor, a piezoelectric vibrating gyro has been proposed as shown, for example, in Japanese Laid-open Patent Application No. H2-80911. The piezoelectric vibrating gyro has been in the actual use in recent years for sensing camera shake of, for example, a video camera. The present applicant proposed a detector for detecting the direction of the HMD by use of the piezoelectric vibrating gyro in Japanese Patent Application No. H6-254910. This detector enables with a simple structure a detection of the direction of the user's head without the place of use being limited.

However, the above-mentioned direction detector detects the direction of the head by integrating an output of the angular velocity sensor and is defective in that a small error of the angular velocity sensor is integrated into a great angle error. It is difficult to completely reduce the output of the piezoelectric vibrating gyro of its stationary state to zero and a minute angular velocity is detected although the head is kept stationary. If the value is integrated for a long time, a great error is caused in the detected angle. Consequently, the direction of the viewing of the user and the image displayed in the HMD disaccord with each other, so that the realism is impaired.

It is desirable to widen the angle of view of the image displayed on the HMD in order to improve the realism. However, the widening of the angle of view has a limitation because of an optical constraint. If the angle of view of the displayed image is widened, the displayed image becomes coarse unless a high-density display device is used, and the realism is impaired. For this reason, the angle of view of the displayed image is generally set at approximately 40° and a small-size and light-weight HMD has been realized.

However, an angle of view of approximately 40° is very narrow compared to the angle of the human field of view. When the angle of view of the displayed image is narrow, the surroundings cannot be seen as if the user were walking in the dark only with the light from a flashlight, and the sense of direction is difficult to obtain. In particular, when the direction of the displayed image varies in accordance with the direction of viewing, the sense of direction tends to be lost unless some kind of reference direction is provided and the sense of direction is not easy to restore once it is lost.

The conventional display apparatus which varies the direction of the displayed image according to a rotation of the user's head can cause a physical pain to the user depending on the direction of the image to be viewed, since the relation between the directions of the user's head and the image to be displayed is fixed and can not be changed. For example, when an upward object is viewed, since it is necessary to look upward, the user's neck becomes fatigued from a long-time viewing. That is, since it is necessary to look strictly in the direction of viewing, the user cannot view the image in a relaxed posture.

When it is impossible for the user to freely change his or her posture, another problem is caused that the image to be displayed is limited. For example, a bedridden user could view only the images corresponding to the condition of lying in bed, even if an HMD is used.

SUMMARY OF THE INVENTION

An object of the present invention is to provide an HMD which correctly detects the direction of the user's head even after a long period of use for varying the displayed image according to the detected direction.

To achieve the above-mentioned object, according to the present invention, an HMD is provided with an angle sensor for detecting an angle of rotation of the user's head, an angular velocity sensor for detecting a velocity of rotation of the head, a calculator for calculating an angle of rotation of the head based on an output from the angle sensor or the angular velocity sensor, and a display controller for displaying an image of a direction in accordance with the angle calculated by the calculator.

The angular velocity sensor has an advantage that it can detect a rotation very quickly, while the angle sensor has an advantage that it can detect the amount of rotation very accurately in a stationary state. The direction of the head of the user wearing the HMD can be detected quickly and accurately by the calculation based on the outputs of these sensors.

Other objects of the present invention are to enable the user to view an image in a desired direction irrespective of the direction of his or her head, and to provide the user with a sense of correct direction in viewing an image, when an image display apparatus which varies the image in accordance with the direction of the head.

To achieve these objects, an image display apparatus is provided with a display device for displaying an image, a direction detector for detecting a direction of viewing by detecting an angle of rotation of the user's head, a direction input device for inputting a direction of viewing manually therefrom, a selector for selecting one direction out of the directions of viewing detected by the direction detector and inputted from the direction input device, and an image display controller for displaying on the display device an image in accordance with the direction selected by the selector.

An image display apparatus for displaying an image varying in accordance with the direction of the head of a user may be provided with a direction detector for detecting a direction of viewing by detecting an angle of rotation of the head, an image display controller for displaying an image in accordance with the direction detected by the direction detector, and an information display controller for displaying information on the direction of viewing.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

Figure 1:
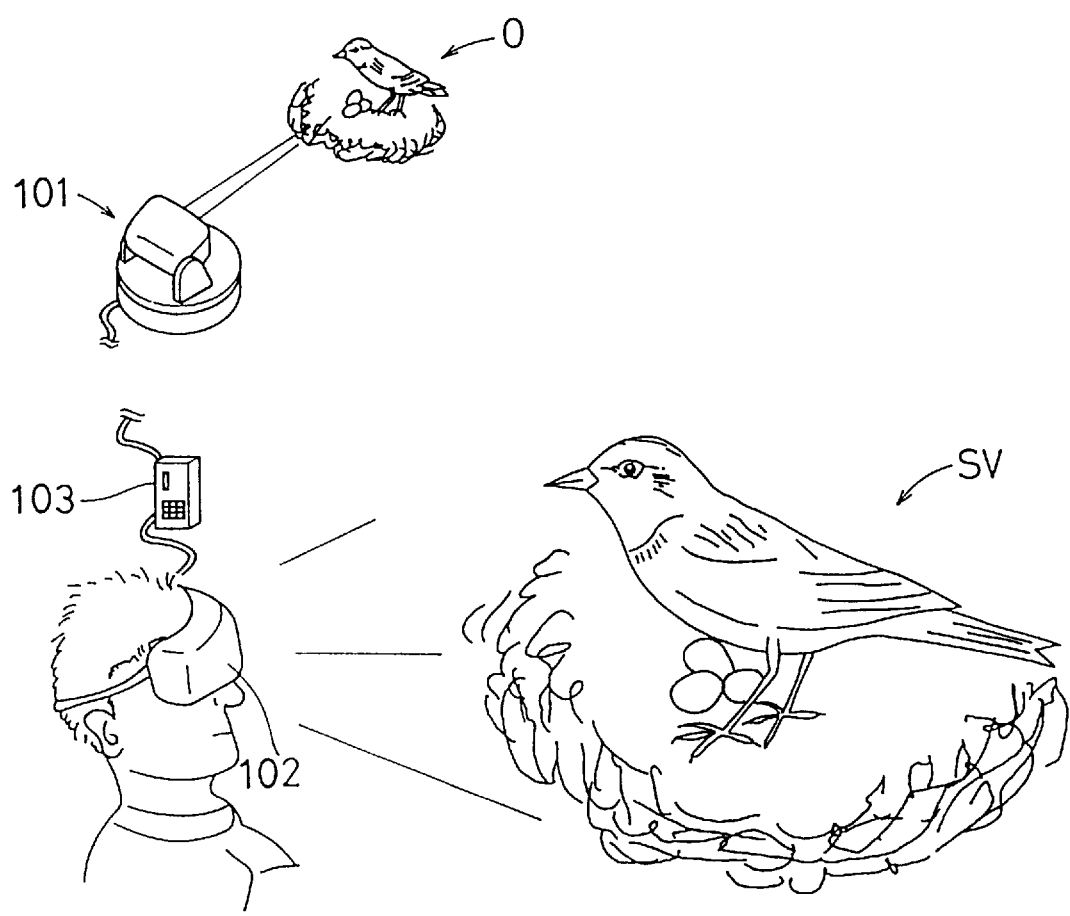
FIG. 1 schematically shows the arrangement of a stereoscopic system including a three-dimensional camera and an HMD of a first embodiment of the present invention.

Referring to FIG. 1, there is shown a stereoscopic system constituted by a combination of a three-dimensional camera and an HMD. The three-dimensional camera 101 has left and right cameras and is placed in the vicinity of an object 0. The HMD 102 incorporates left and right virtual image projectors for projecting a virtual image to the left and right eyes and provides the user wearing the HMD 102 with a stereoscopic image SV by projecting the virtual image of an object image taken by the left camera of the three-dimensional camera 101 to the left eye and projecting the virtual image of an object image taken by the right camera to the right eye. It is not necessary to position the HMD 102 close to the three-dimensional camera 101 and the HMD wearing user can view the image away from the location of shooting. A controller 103 performs controls such as the detection of direction of the HMD wearing user's head and the setting of direction of the three-dimensional camera 101 and is set close to the HMD 102 so that the HMD wearing user can operate it.

Figure 2:
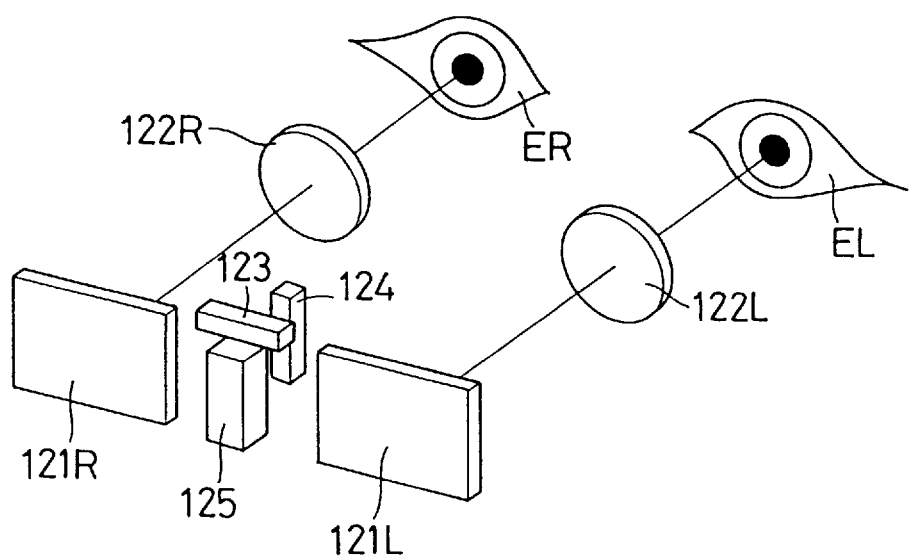
FIG. 2 shows an internal structure of the HMD.

Referring to FIG. 2, there is shown an internal view of the HMD 102. Reference designation 121R represents a display device formed of a liquid crystal display (LCD) panel for providing a right eye ER with an image. Likewise, reference designation 121L represents a display device formed of a liquid crystal display panel for providing a left eye EL with an image. Reference designation 122R is an eyepiece for projecting a virtual image of the image on the liquid crystal display panel 121R to the right eye ER. Likewise, reference designation 122L is an eyepiece for projecting a virtual image of the image on the liquid crystal display panel 121L to the left eye EL.

Reference designations 123 and 124 represent piezoelectric vibrating gyros which sense an angular velocity and output a voltage corresponding to the sensed angular velocity. The piezoelectric vibrating gyro is pillar-shaped and capable of detecting an angular velocity in a direction vertical to its axis. The angular velocity of vertical rotation of the head is detected by the gyro 123 and the angular velocity of horizontal rotation is detected by the gyro 124. The amounts of horizontal and vertical rotations of the head are obtained by integrating the angular velocities detected by the piezoelectric vibrating gyros 123 and 124.

Reference designation 125 represents a horizontal sensor for detecting the levelness of the direction of the HMD wearing user's head. The liquid crystal display panels 121R and 121L, eyepieces 122R and 122L, piezoelectric vibrating gyros 123 and 124, and the horizontal sensor 125 are incorporated in a non-illustrated body of the HMD. The HMD 102 is worn by the user on his or her head through a non-illustrated attachment member.

Figure 3A:
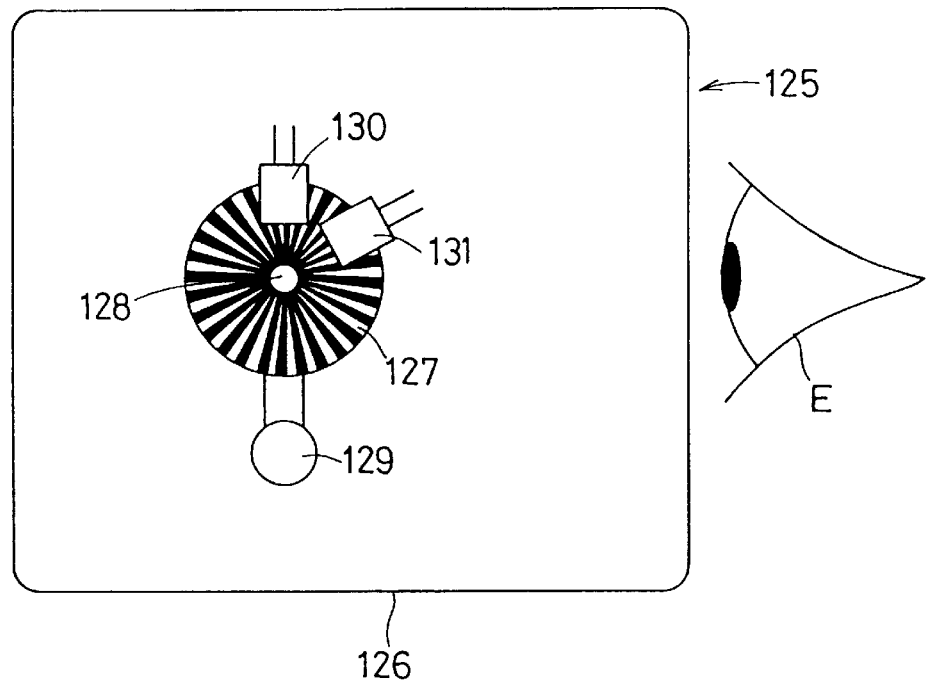
FIGS. 3A and 3B are front views showing a structure and operation of a horizontal sensor.
Figure 3B:
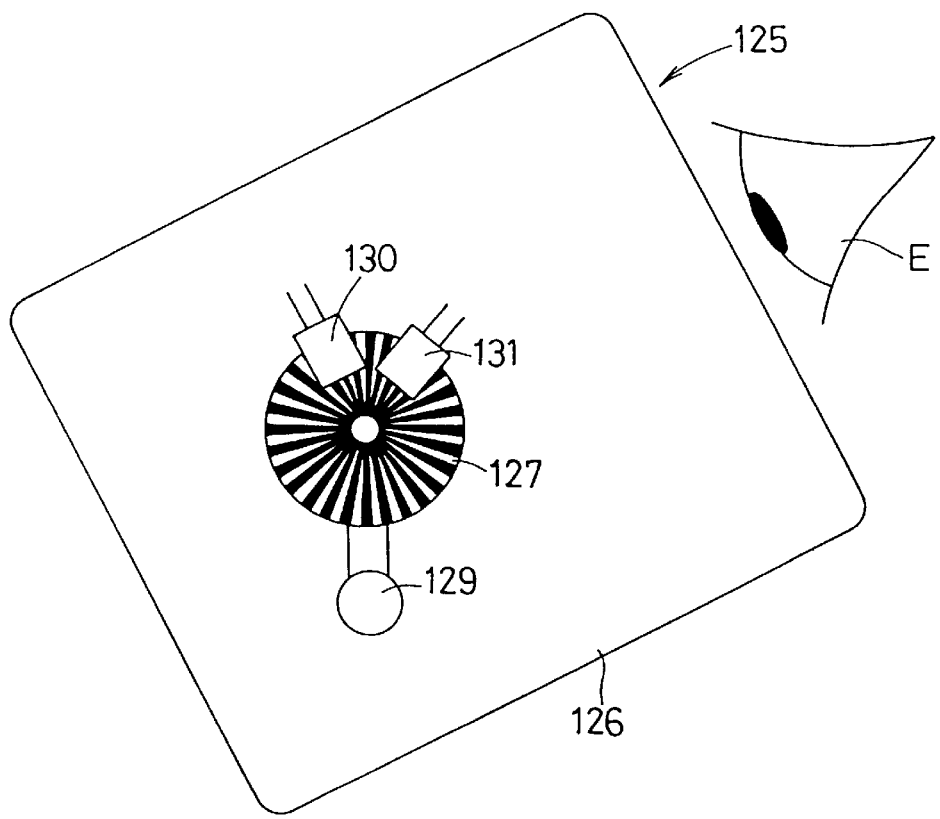
Figure 4:
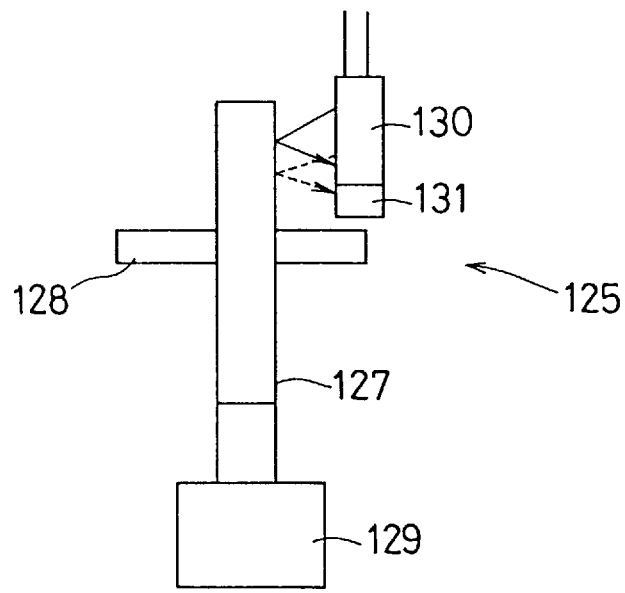
FIG. 4 is a side view showing the structure and operation of the horizontal sensor.

Referring to FIGS. 3A, 3B and 4, a specific structure and an operation of the horizontal sensor 125 will be described. FIGS. 3A and 3B are front views of the horizontal sensor 125. FIG. 4 is a side view thereof. In these figures, reference designation 126 represents a support plate fixed to the HMD body so as to be vertical to a straight line that connects the left and right liquid crystal display panels 121L and 121R, and reference designation E represents the user's eye. Reference designation 127 represents an encoder plate where a radial pattern of alternate black and white portions is printed. The white portions of the pattern reflect light, whereas the black portions absorb light. The encoder plate 127 is attached to the support plate 126 so as to be rotatable about a rotation axis 128. Reference designation 129 represents a weight fixed to the encoder plate 127.

Reference designations 130 and 131 represent photoreflectors fixed to the support plate 126. The photoreflectors 130 and 131 each have a light emitting device and a light receiving device which are not shown, and as shown by the arrows in FIG. 4, emits light from the light emitting device to the encoder plate 127 to detect the reflected light by the light receiving device and outputs an electric signal according to the detection of the light.

In the horizontal sensor 125 of the above-described structure, when the HMD wearing user rotates his or her head upward or downward, the directions of the photoreflectors 130 and 131 vary accordingly, whereas the direction of the encoder plate 127 is maintained fixed because of the gravity acting on the weight 129. FIG. 3A shows a condition in which the HMD wearing user's head is horizontal. FIG. 3B shows a condition in which the head has rotated downward. A change in direction of the head from the condition of FIG. 3A to that of FIG. 3B causes the photoreflectors 130 and 131 to rotate with respect to the encoder plate 127. The reflected light from the encoder plate 127 detected by the light receiving devices of the photoreflectors 130 and 131 is intermittent during this rotation.

Figure 5:
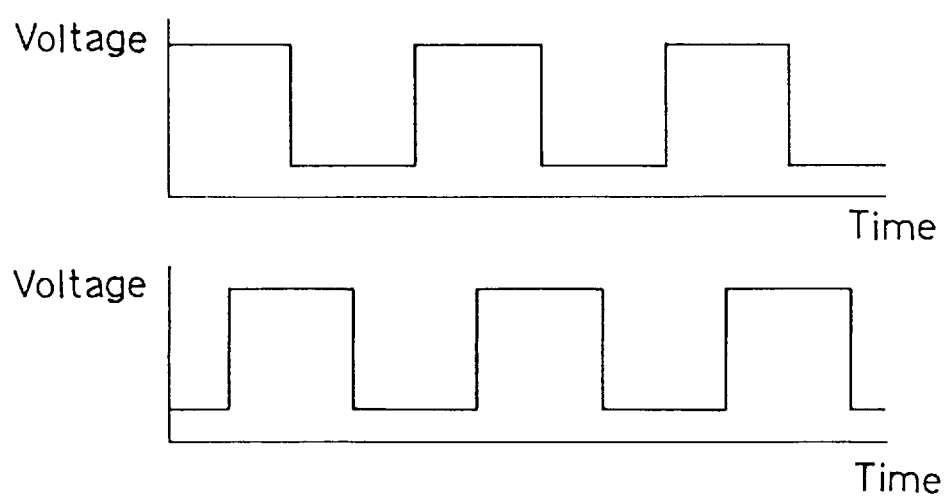
FIG. 5 shows output signals of a pair of photoreflectors.

The photoreflector 130 and the photoreflector 131 are positioned so that one is shifted from the other by one fourth the period of the black and white pattern of the encoder plate 127. Referring to FIG. 5, there is shown an example of output signals of two photoreflectors arranged in this positional relationship. Here, the output electric signals after shaped into square pulses are shown. The period of the signal is dependent on the width of the black and white portions of the pattern and varies according to the velocity of rotation. Therefore, the angle of rotation of the head is known from the pulse count and the pattern period of the encoder plate 127. The signals shown in FIG. 5 correspond to a downward rotation of the head. As is apparent from the figure, the output signals of the photoreflectors 130 and 131 are shifted from each other by one fourth of the period. Since phase difference of the output signals of the two photoreflectors 130 and 131 becomes opposite, i.e. one fourth and three fourths, between an upward rotation and a downward rotation, the direction of rotation is detected from the phase difference of the signals.

Figure 6A:
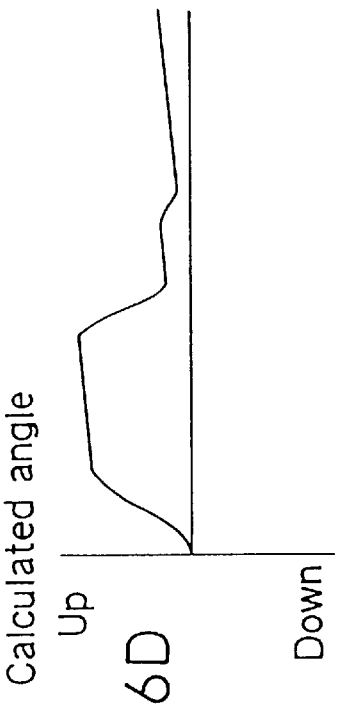
FIGS. 6A to 6F show a relationship among a rotation of the head, an output of a piezoelectric vibrating gyro and an output of the horizontal sensor.
Figure 6B:
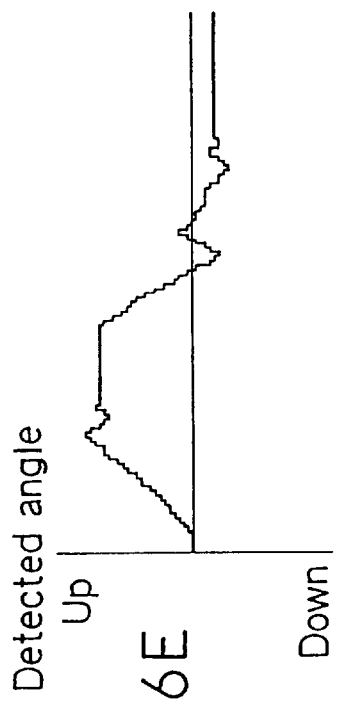

Referring to FIGS. 6A to 6F, an output of the piezoelectric vibrating gyro 123 and an output of the horizontal sensor 125 will be described. FIG. 6A shows a vertical rotation of the user's head. The longitudinal axis represents an angle of viewing of the user's head in the vertical direction and the lateral axis represents time. Initially the user is viewing an object at the level of the eyes, then views an object at a higher level. After a while the user views the object at the eye level again, and finally views an object at a little lower level. FIG. 6B shows an angular velocity of the user's head corresponding to the above-mentioned motion. When the head is rotating upward, an upward angular velocity is generated, whereas when the head is rotating downward, a downward angular velocity is generated.

Figure 6C:
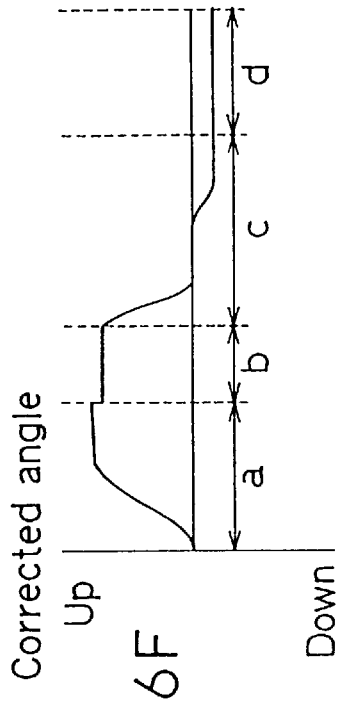
Figure 6D:
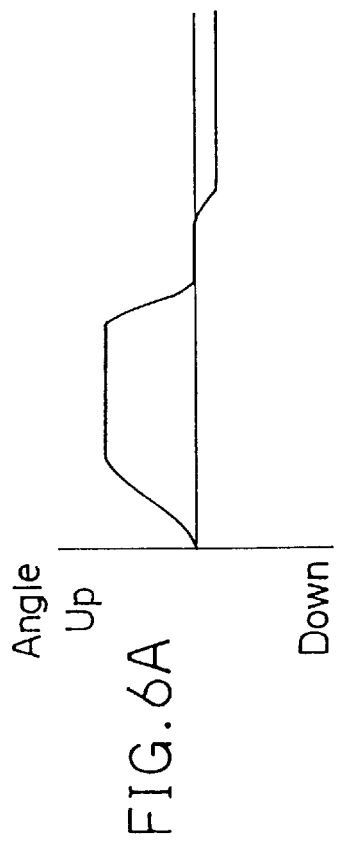

FIG. 6C shows an output of the angular velocity sensor. When the head is stationary, a signal having an error of ΔS is outputted. The error varies according to the environmental temperature and the elapsed time. In order to obtain an angle from an angular velocity, it is necessary to integrate the angular velocity. FIG. 6D shows an angle obtained by integrating the angular velocity of FIG. 6C. Since the error of ΔS is integrated therewith, the obtained angle comes to have a great error with the passage of time. Thus, although the piezoelectric vibrating gyro is excellent in responsibility and accuracy when used for sensing the direction of the head for a comparatively short period of time, the error is accumulated when the gyro is used for a long period of sensing. In the present embodiment, the error is removed by use of an output of the horizontal sensor 125.

Figure 6E:
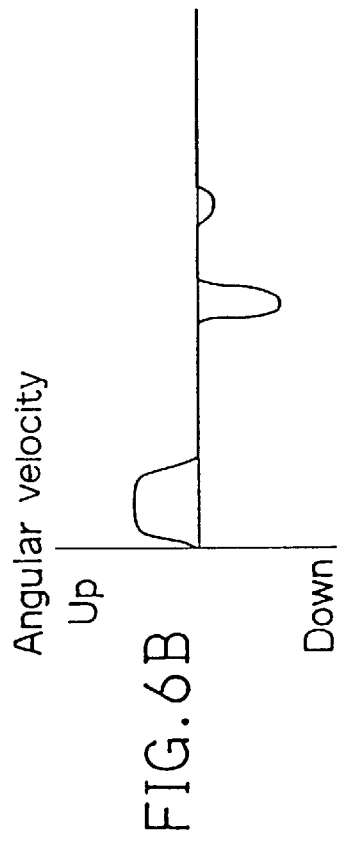

FIG. 6E shows an angle obtained by adding or subtracting the output of the horizontal sensor 125 according to the rotation direction. The angle detected by the horizontal sensor 125 has a delay in response and an overshoot for the direction of the head. However, the sensor 125 outputs a correct signal while the direction of the head is steady and hardly varies.

Figure 6F:
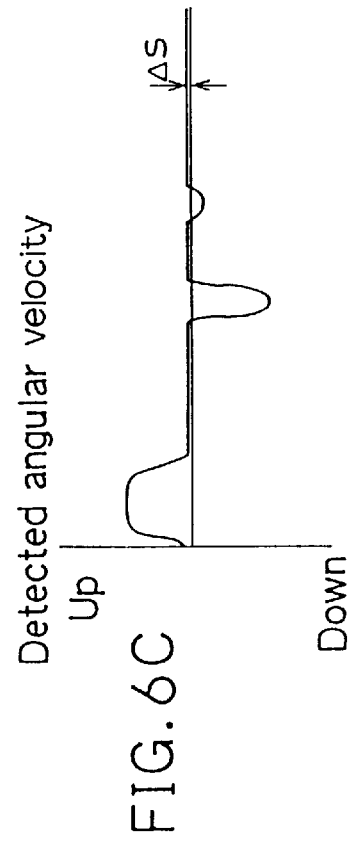

FIG. 6F shows a calculated angle obtained from the angle detected by the piezoelectric vibrating gyro 123 and the angle detected by the horizontal sensor 125. The angle in the range a is the same as the angle detected by the piezoelectric vibration gyro 123. In the range b, the horizontal sensor 125 is stable and the angle detected by the horizontal sensor 125 is used. In the range c, since the user is changing the direction of his or her head, the angle detected by the piezoelectric vibrating gyro 123 is used. At the point between the range a and the range b, where the head is kept stationary, the error ΔS of output of the piezoelectric vibrating gyro 123 of stationary state is corrected to minimize the accumulated error caused during the period of the range c. The correction will be described later in detail. In the range d, the horizontal sensor 125 is stable and the angle detected by the horizontal sensor 125 is used.

Figure 7:
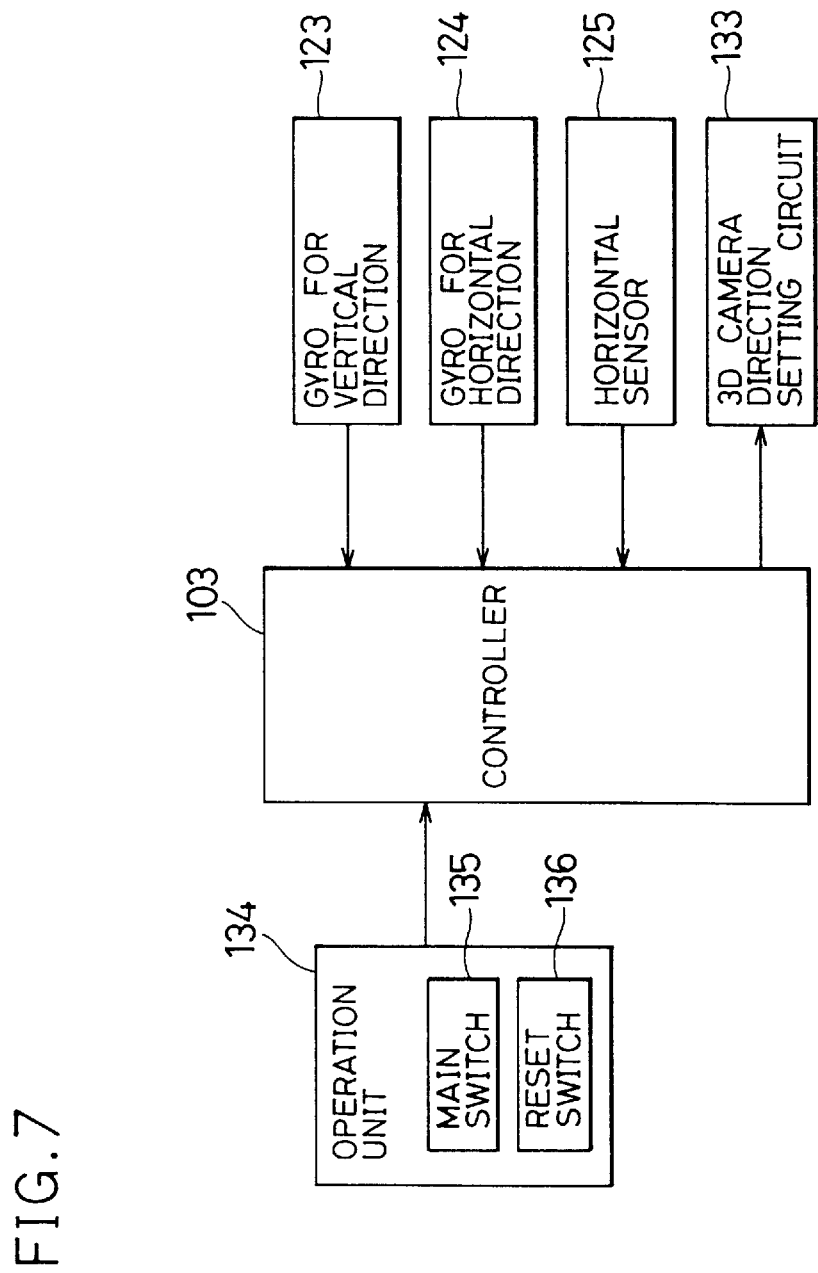
FIG. 7 is a block diagram showing a circuit arrangement of the stereoscopic system.

Referring to FIG. 7, there is shown a circuit diagram of the stereoscopic system of the present embodiment. Reference designation 103 represents the controller which sets the direction of the three-dimensional camera 101 based on the input from the sensors. Reference designation 123 represents the piezoelectric vibrating gyro which detects the velocity of vertical rotation. Reference designation 124 represents the piezoelectric vibrating gyro which detects the velocity of horizontal rotation. Reference designation 125 represents the horizontal sensor. As described previously, the piezoelectric vibrating gyros 123 and 124 and the horizontal sensor 125 are incorporated in the HMD. Reference designation 133 represents a circuit which sets the direction of the three-dimensional camera 101. Reference designation 134 represents an operation unit for the HMD wearing user to operate the system and has a main switch 135 for providing control start and end instructions to the controller 103, and a reset switch 136.

Figure 8:
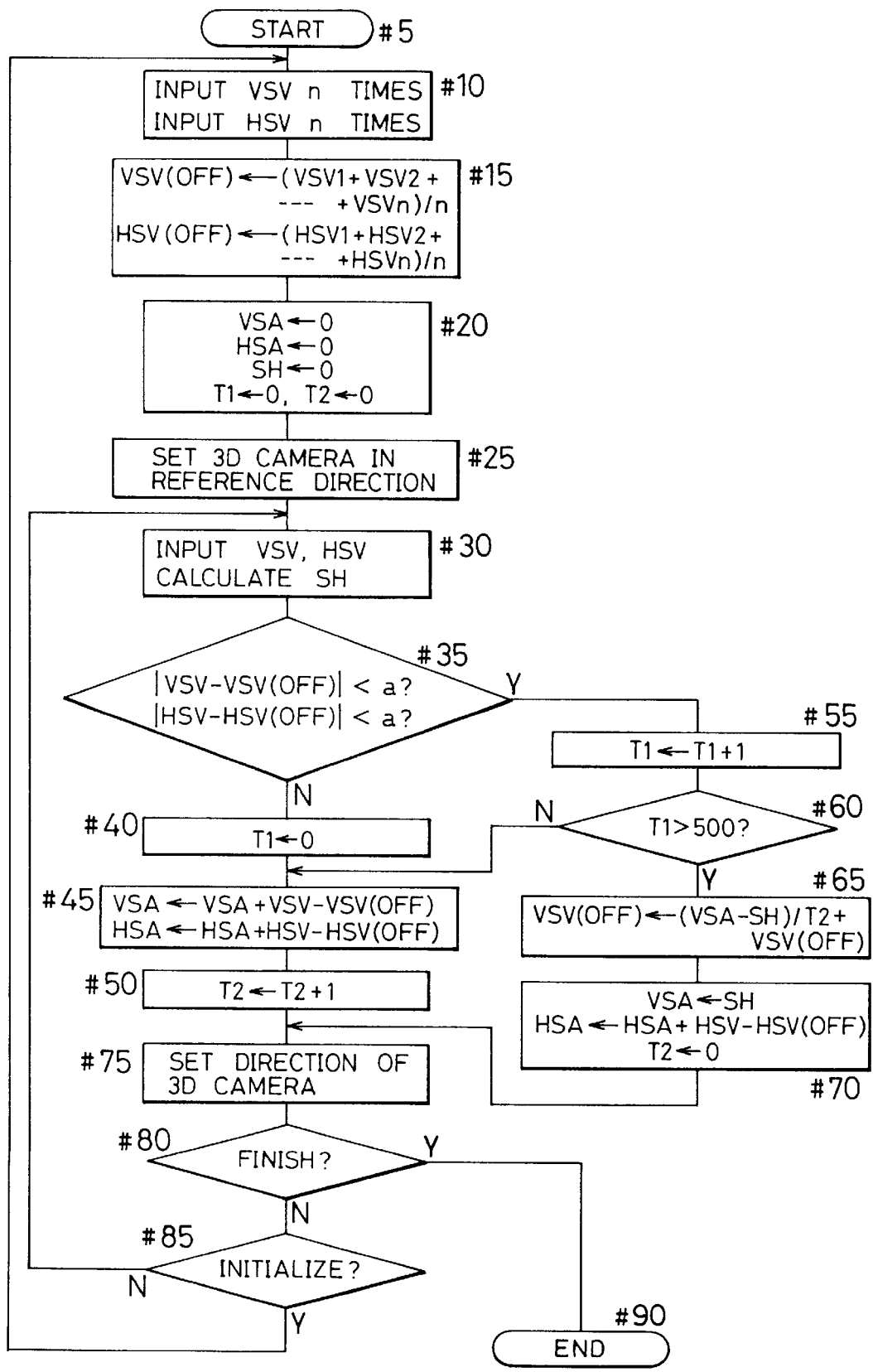
FIG. 8 is a flowchart of a control processing performed by a controller.

Subsequently, a specific operation of the present embodiment will be described. The flowchart of FIG. 8 shows a processing performed by the controller 103 of FIG. 7. When the main switch 135 is turned on, the controller 103 starts the control (step #5) and performs an initial setting (steps #10 to #25).

First, with the HMD wearing user's head being horizontal and stationary in a predetermined direction, an output VSV of the piezoelectric vibrating gyro 123 which detects the velocity of vertical rotation and an output HSV of the piezoelectric vibrating gyro 124 which detects the velocity of horizontal rotation are each inputted n times (step #10). Then, the average value of the n vertical direction input values VSV1, VSV2, . . . , and VSVn is obtained and set as VSV(OFF). Likewise, the average value of the n horizontal direction input values HSV1, HSV2, . . . , and HSVn is set as HSV(OFF) (step #15). Thus, the outputs of the piezoelectric vibrating gyros 123 and 124 of stationary state are set as VSV(OFF) and HSV(OFF), respectively. In this embodiment, the number of times n of the input is 1024.

Then, angles VSA and HSA representative of the vertical and horizontal directions of the head to be detected by the piezoelectric vibrating gyros 123 and 124, respectively, are both set at 0, and an angle SH representative of a vertical angle of the head to be detected by the horizontal sensor 125 is also set at 0. Counters T1 and T2 for counting time are initialized to 0 (step #20). Then, the three-dimensional camera 101 is set in a horizontal reference direction (step #25).

After the above-described initial setting has been completed, the processing of detecting the direction of the head of the user wearing the HMD 102 and setting the three-dimensional camera 101 in a direction in accordance with the detected direction is started. This processing is performed in a cycle of 1 msec.

First, the outputs VSV and HSV of the piezoelectric vibrating gyros 123 and 124 are inputted and the vertical angle SH is calculated from the output of the horizontal sensor 125 (step #30). As has already been described, to obtain SH, the pulse signal from the horizontal sensor 125 is added or subtracted according to the direction of rotation and the result is multiplied by a predetermined coefficient so as to coincide with the outputs of the piezoelectric vibrating gyros in unit. Then, the outputs of the piezoelectric vibrating gyros 123 and 124 are compared with the outputs during the stationary state to judge whether the direction of the head is being changed or not (step #35). When conditions |VSV-VSV(OFF)|<a and |HSV-HSV(OFF)|<a where a is a predetermined angular velocity are both fulfilled, it is judged that the head is stationary. When any of the conditions is not fulfilled, it is judged that the direction of the head is being changed. In this embodiment, the predetermined value a is set at 1°/sec.

When the direction of the head is being changed, the displayed image is changed based on the directions of the head detected by the piezoelectric vibrating gyros 123 and 124. The counter T1 is initialized to 0 (step #40) and the detected angle is integrated to determine the direction of the head (step #45). Specifically, the integration is performed in such a manner that the outputs VSV(OFF) and HSV(OFF) of stationary state are subtracted from the detected angular velocities VSV and HSV and the differences are added to the angles VSA and HSA representative of the direction of the head at that point of time. Since this processing is executed in a cycle of 1 msec, an integral value with a sufficient degree of accuracy is obtained. Then, 1 is added to the counter T2 (step #50). The counter T2 counts the time of integration of the angular velocities outputted by the piezoelectric vibrating gyros 123 and 124.

When it is judged at step #35 that the HMD wearing user's head is stationary, the vertical head direction VSA is set at the angle detected by the horizontal sensor 125 and the vertical direction output VSV(OFF) of stationary state of the piezoelectric vibrating gyro 123 is corrected. First, 1 is added to the counter T1 (step #55). Then, whether the counter T1 exceeds 500 or not is judged (step #60). Since the counter T1 is cleared at step #40 when the head is rotating, the counter T1 represents the time elapsed since the head became stationary. Since the processing cycle is 1 msec, whether 500 msec have elapsed since the head became stationary or not is judged at step #60.

When 500 msec have not elapsed, it is judged that the output of the horizontal sensor has not been stabilized and the process branches to step #45. When the elapsed time exceeds 500 msec, it is judged that the output of the horizontal sensor has sufficiently been stabilized and the process proceeds to step #65.

The difference between the vertical angle VSA detected by the piezoelectric vibrating gyro 123 and the vertical angle SH detected by the horizontal sensor 125 is obtained. Since the output of the horizontal sensor 125 is sufficiently reliable at that time, this difference is the error caused by the accumulation of output error of the piezoelectric vibrating gyro 123. This error is divided by the time T2 of integration of the output of the piezoelectric vibrating gyro 123 and the result is added to the vertical direction output VSV(OFF) of the stationary state (step #65). Thereby, the output error of the piezoelectric vibrating gyro 123 is corrected to improve the integration accuracy in the next and succeeding processings, so that a more accurate vertical direction is obtained by the piezoelectric vibrating gyro 123. Then, the output SH of the horizontal sensor 125 is set as the vertical head direction VSA, the output of the piezoelectric vibrating gyro 124 is integrated to update the horizontal angle HSA in the same manner as in step #45, and the counter T2 is cleared to 0 (step #70).

After the processing of steps #40 to #50 executed when the head is rotating or the processing of steps #55 to #70 executed when the head is stationary has been completed, the direction of the three-dimensional camera 101 is adjusted based on the determined head directions VSA and HSA (step #75). Then, whether the continuation of the control is requested or not is judged based on the setting of the main switch 135 (step #80). When the main switch 135 is off, the control is finished (step #90). When the main switch 135 is maintained on, whether initialization is requested or not is judged based on the setting of the reset switch 136 (step #85). When the reset switch 136 is on, the process returns to step #10 to perform the initialization from steps #10 to #25 once again and then, executes the processing of step #30 and succeeding steps. When the reset switch 136 is off, the process returns directly to step #30 to repeat the processing.

While a sensor (horizontal sensor 125) which detects the angle directly is used only with respect to the vertical direction in this embodiment, a sensor directly detecting the angle, for example, a geomagnetic sensor may be used with respect to the horizontal direction to improve the detection accuracy of the head in this direction. While this embodiment adopts the method in which the direction of the three-dimensional camera 101 is varied and the shooting range is changed to vary the image displayed in the HMD, another method may be adopted where an image of a wide area previously taken is stored and only a part of the image is reproduced according to the direction of the HMD wearing user's head. Further, by generating an image by a computer and moving the computer-generated image according to the detected head direction, so-called virtual reality having a high realism is realized.

As described above, according to the present embodiment, the direction of the user's head is detected by use of the angle sensor which is capable of detecting an accurate angle although its response is slow, and the angular velocity sensor which has a quick response although the angular velocity detected thereby tends to have an error and the accuracy of the angle obtained by the integration is inferior. By using the advantage of the angle sensor when the head is stationary and using the advantage of the angular velocity sensor when the head is rotating, an image which accords with the direction of the head is always provided to the user.

Figure 9:
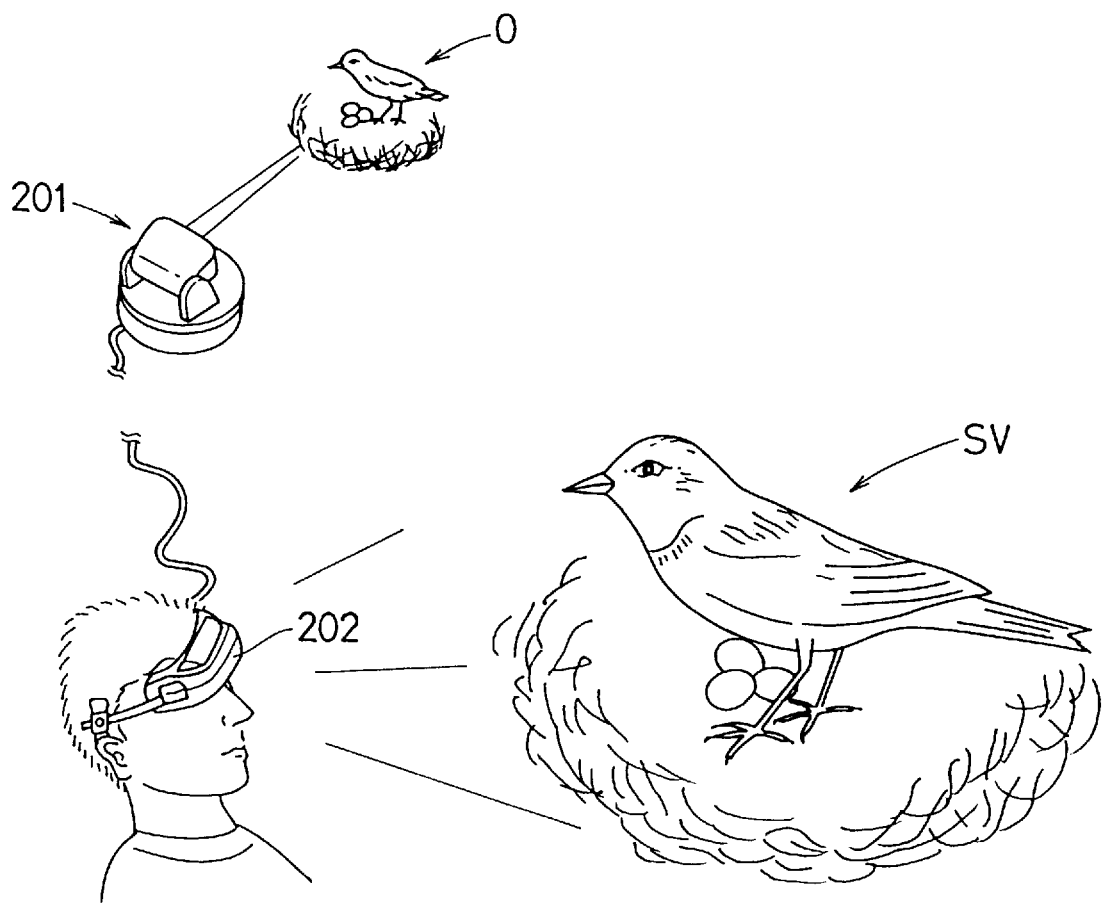
FIG. 9 schematically shows the arrangement of a stereoscopic system including a three-dimensional camera and an HMD of a second embodiment of the present invention.

Referring to FIG. 9, there is shown the arrangement of a stereoscopic system of a second embodiment of the present invention. This system is similar to that of the first embodiment, but a three-dimensional camera and an HMD is directly connected to each other without a unit corresponding to the controller 103 shown in FIG. 1. The functions to be performed by the controller are separated for the camera and for the HMD, and the circuits for them are incorporated in the three-dimensional camera 201 and the HMD 202, respectively.

Figure 10:
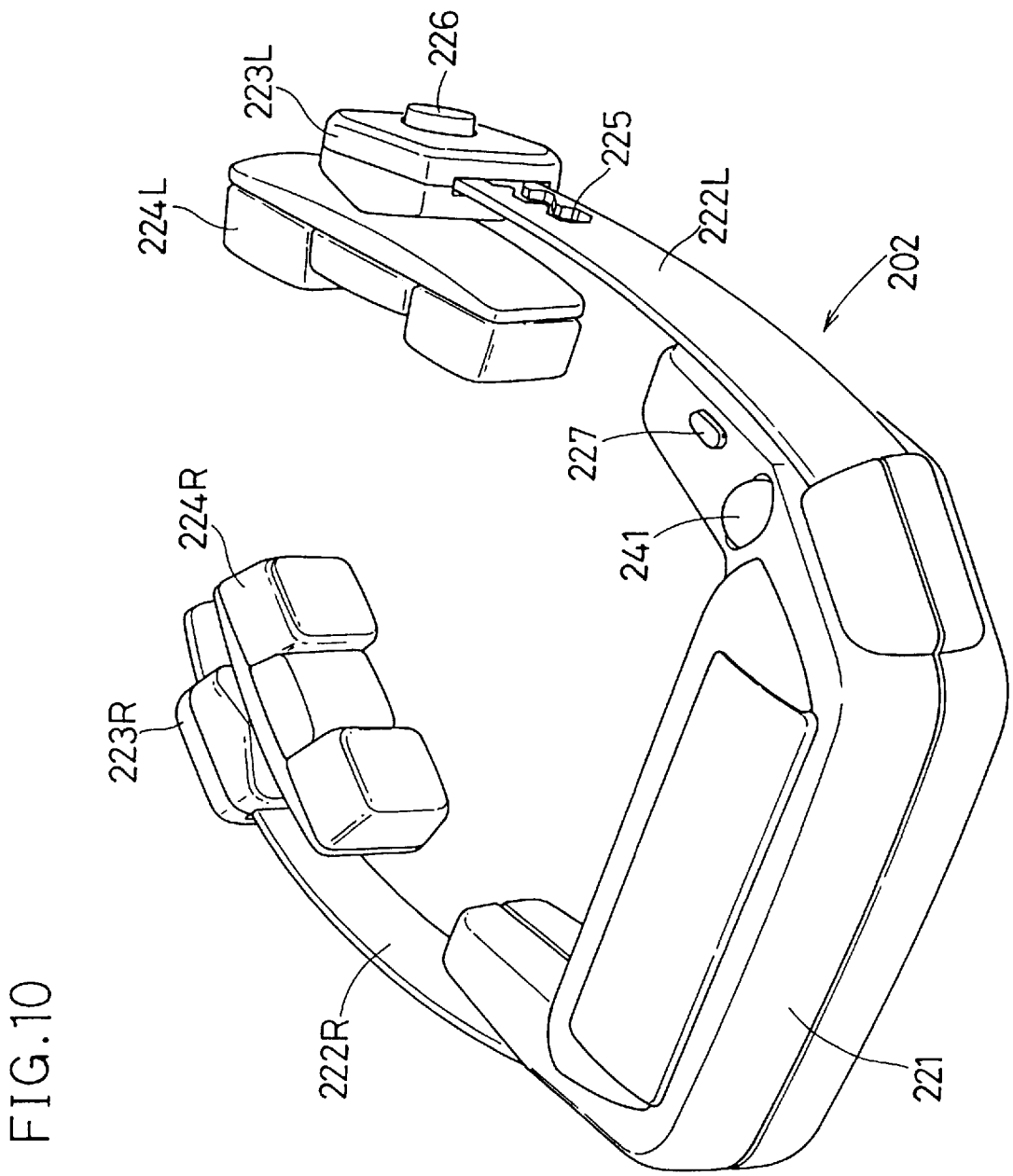
FIG. 10 is an external perspective view of the HMD.

Referring to FIG. 10, there is shown an external view of the HMD 202. Reference designation 221 represents a body cover incorporating the left and right virtual image projectors. At a lower central portion of the body cover 221 is formed a non-illustrated nose pad. Reference designations 222L and 222R represent left and right holding levers fixed to the body cover 221. The levers 222L and 222R are formed of a resilient material to curve inward. Reference designations 223L and 223R represent sliders which are movable backward and forward along the holding levers 222L and 222R, respectively. Reference designations 224L and 224R represent head pads which abut the sides of the HMD wearing user's head, respectively. The inner surfaces of the head pads 224L and 224R which are in contact with the head are formed of a soft material. The head pads 224L and 224R are attached to the inner surfaces of the sliders 223L and 223R, respectively, so as to be rotatable about a vertical axis.

A guide groove 225 is formed in the outer surface of each of the holding levers 222L and 222R. The sliders 223L and 223R each have a button 226 engaging in the guide groove 225 inside the slider 223L or 223R. The sliders 223L and 223R are movable when the button 226 is depressed and are fixed to the holding levers 222L and 222R when the button 226 is released. Thereby, the fore-and-aft position of the head pads 224L and 224R is adjusted.

The HMD 202 is put on the head so that the body cover 221 is located before the eyes. When worn on the head, the HMD 202 is supported at the head pads 224L and 224R, and the nose pad. Since the head pads 224L and 224R are pressed against the head by the resiliency of the holding levers 222L and 222R, the HMD 202 is securely attached and never moves. Consequently, the HMD 202 moves integrally with the head.

Reference designation 227 represents a starter switch which starts the control of the HMD 202. Reference designation 241 represents a rotary ball manually operated by the HMD wearing user. These members are provided on the upper surface of the body cover 221 for convenience of operation. Function of the rotary ball 241 will be described later in detail.

Figure 11:
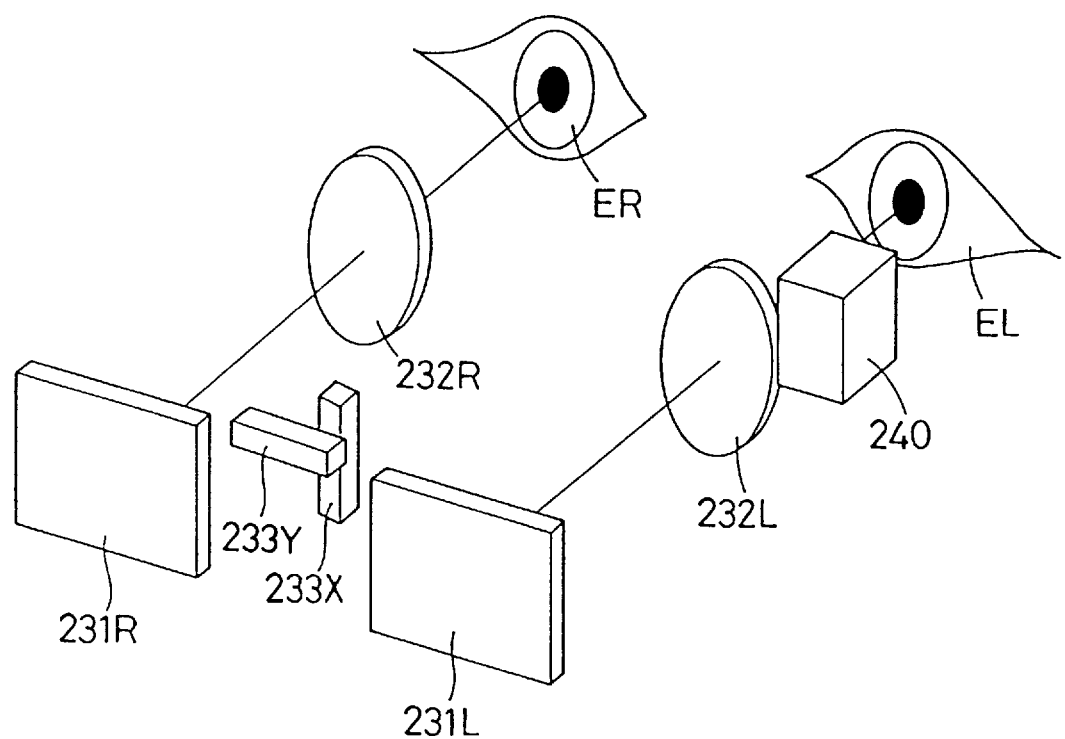
FIG. 11 is an internal view of the HMD.

Referring to FIG. 11, there is shown a schematic internal view of the HMD 202. As compared to the HMD 102 shown in FIG. 2, the horizontal sensor 125 is omitted and a manual direction setting portion 240 including the above-described rotary ball 241 is provided. Reference designations 231L and 231R represent left and right liquid crystal display panels each serving as a display device. Reference designations 232L and 232R represent left and right eyepieces which direct image light of the left and right liquid crystal display panels 231L and 231R to left and right eyes EL and ER. The HMD wearing user views a virtual image by viewing the images on the liquid crystal display panels 231L and 231R through the eyepieces 231L and 231R. The liquid crystal display panel 231L and the eyepiece 232L constitute the left virtual image projector, and the liquid crystal display panel 231R and the eyepiece 232R constitute the right virtual image projector.

Reference designations 233X and 233Y represent a piezo-electric vibrating gyro for sensing the direction of the HMD wearing user's head. The gyro 233X detects the angular velocity of horizontal rotation of the head, and the gyro 233Y detects the angular velocity of vertical rotation of the head. In this embodiment, the horizontal and vertical directions will also be referred to as X and Y directions, respectively.

The liquid crystal display panels 231L and 231R, the eyepieces 232L and 232R, the piezoelectric vibrating gyros 233X and 233Y, and the manual direction setting portion 240 are incorporated in the body cover 221 to be worn by the user on his or her head.

Figure 12:
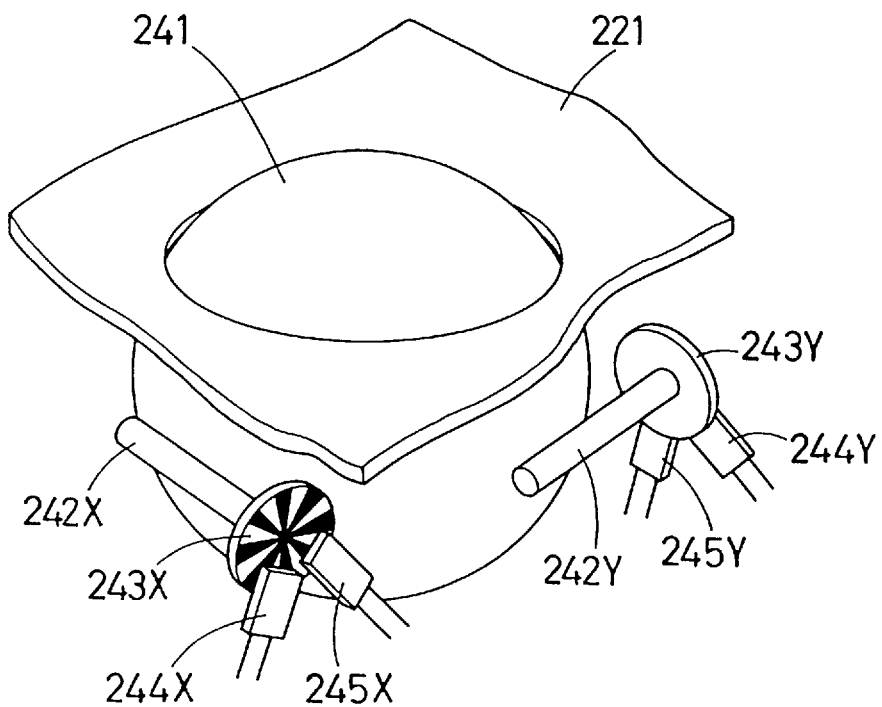
FIG. 12 shows the structure of a manual direction setting portion.

Referring to FIG. 12, there is shown the structure of the manual direction setting portion 240. Reference designation 221 represents the previously described body cover. In this figure, only a part around the rotary ball 241 is shown for explaining the internal structure. The surface of the rotary ball 241 is covered with a material such as rubber having a great friction coefficient. Reference designations 242X and 242Y are rotary roller which are cylindrical in shape. The rotary rollers 242X and 242Y are disposed in a plane passing through the center of the rotary ball 241 so as to be perpendicular to each other and to be in contact with the rotary ball 241. The rotary roller 242X rotates when the rotary ball 241 rotates leftward or rightward, while the rotary roller 242Y rotates when the rotary ball 241 rotates front-ward or backward. Consequently, the direction of rotation of the rotary roller 242X corresponds to the X direction and the direction of rotation of the rotary roller 242Y, to the Y direction.

Reference designations 243X and 243Y represent encoder plates each having a radial pattern of alternate black and white portions printed on one surface. The encoder plates 243X and 243Y are fixed to one end of the rotary rollers 242X and 242Y, respectively, to rotate as the rotary rollers 242X and 242Y rotate. Photoreflectors 244X and 245X, and 244Y and 245Y are respectively disposed opposite the surfaces of the encoder plates 243X and 243Y where the black and white pattern is formed.

The photoreflector 244X and the photoreflector 245X are positioned so that one is shifted from the other by one fourth the period of the black and white pattern of the encoder plate 243X. Therefore, there is a phase difference of one fourth between the output signals of the photoreflectors 244X and 245X, as shown in FIG. 5. The amount of rotation in the X direction is determined based on the pulse count and the period of the pattern printed on the encoder plate 243X, and whether the rotation is positive or negative is known from the phase difference. The photoreflectors 244Y and 245Y are arranged in the same positional relationship as the photoreflectors 244X and 245X. The amount and direction of the rotation of the encoder plate 243Y are detected by the photoreflectors 244Y and 245Y.

Figure 13:
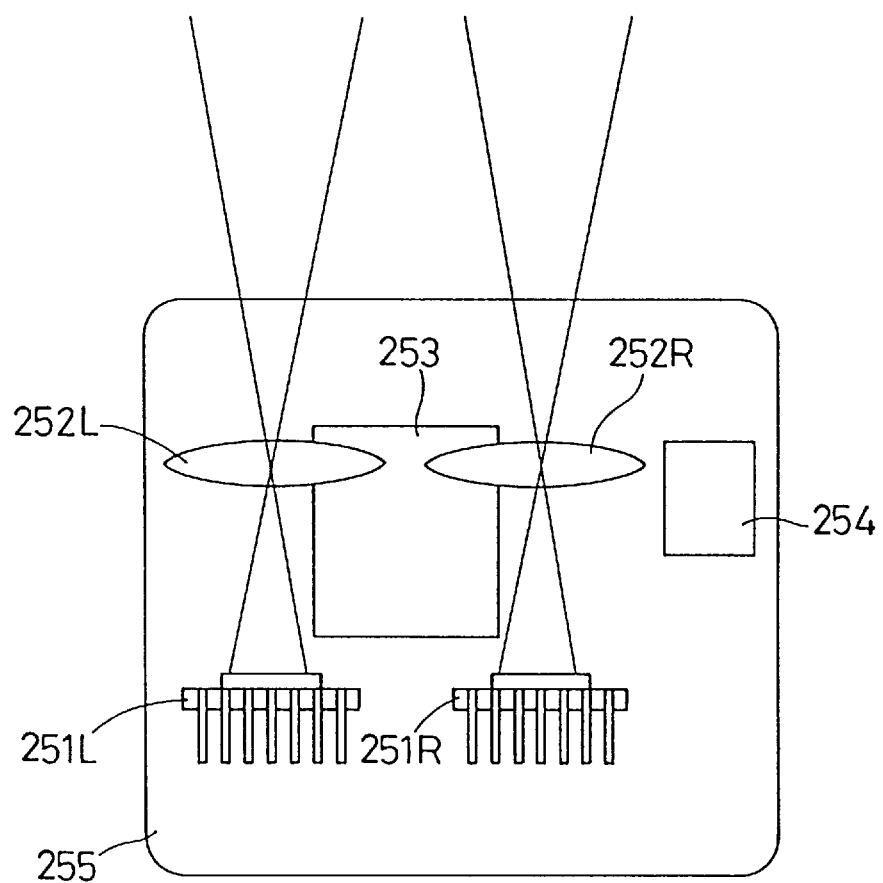
FIG. 13 schematically shows the structure of the three-dimensional camera.

Referring to FIG. 13, there is schematically shown the structure of the three-dimensional camera 201. Reference designations 251L and 251R represent left and right charge coupled devices (CCDS) each serving as an image sensing device. Reference designations 252L and 252R represent left and right taking lenses. The image sensing device 251L and the taking lens 252L constitute the left camera which is held in a non-illustrated lens barrel to be attached to a base plate 255. The image sensing device 251R and the taking lens 252R constitute the right camera which is similarly held in a non-illustrated lens barrel to be attached to the base plate 255. Light beams incident through the left and right taking lenses 252L and 252R are respectively imaged on the light receiving surfaces of the CCD 251L and CCD 251R which photoelectrically convert the light beams. Electrical signals from the left and right CCDs 251L and 251R are converted into left and right video signals by a non-illustrated circuit.

Reference designation 253 represents an inclination sensor which detects a change of a liquid surface caused by an inclination as a change in capacitance by use of a capacitor plate. The vertical angle of shooting of the three-dimensional camera 201 is detected by the inclination sensor 253. Reference designation 254 represents an electronic compass which detects the direction of the geomagnetism to detect the direction of the three-dimensional camera 201. The base plate 255 is fixed on a non-illustrated direction setting mechanism. The three-dimensional camera 201 is configured so as to be freely oriented in the vertical and horizontal directions.

Figure 14:
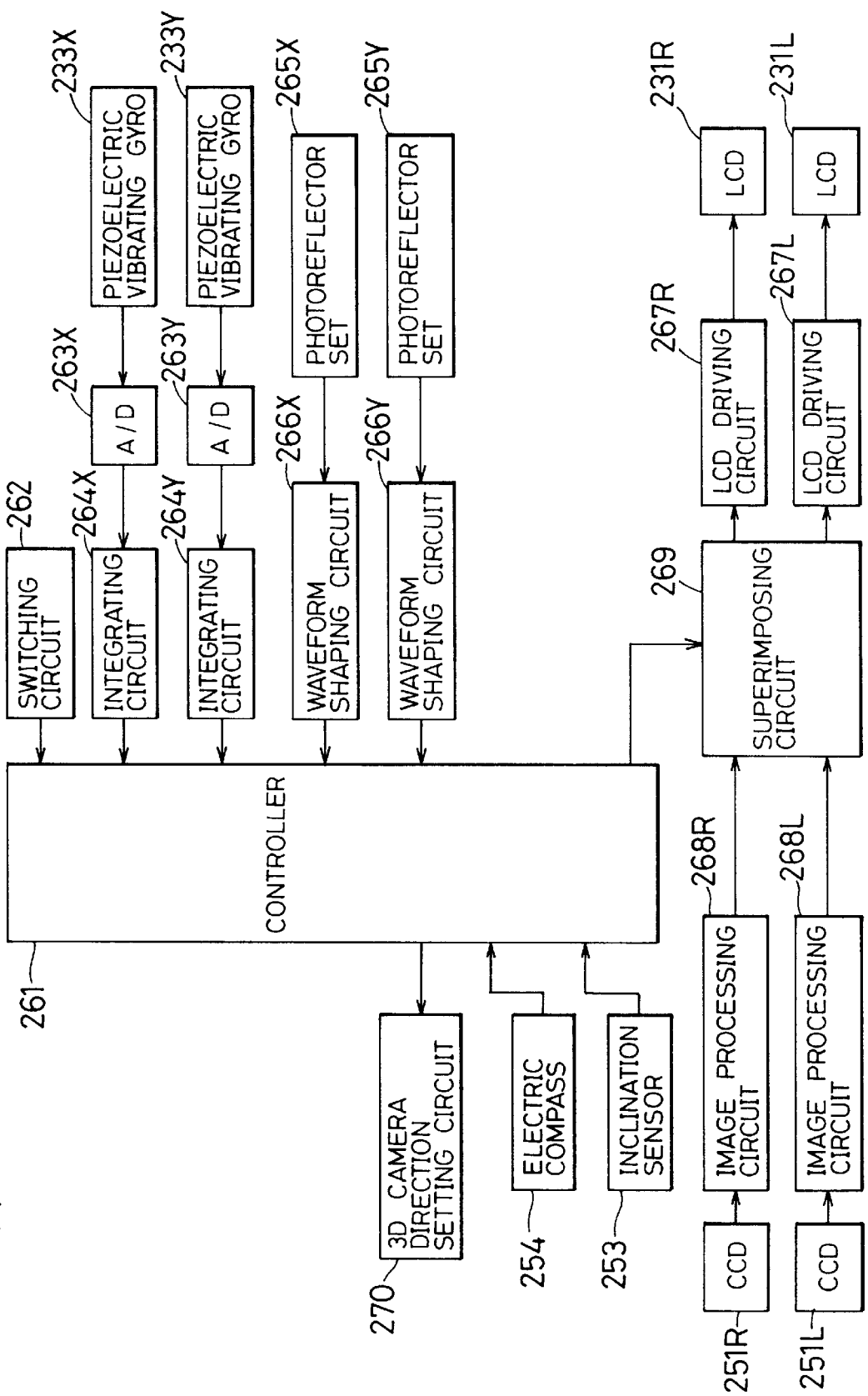
FIG. 14 is a block diagram showing a circuit arrangement of the stereoscopic system.

Referring to FIG. 14, there is shown the circuit arrangement of the stereoscopic system according to the present embodiment. Reference designation 261 represents a controller which controls the entire system. A microcomputer is used therefor. Reference designation 262 represents a switching circuit connected to the previously described starter switch 227 for outputting an electric signal to the controller 261 according to the user's operation.

Reference designations 233X and 233Y represent the piezoelectric vibrating gyros which detect the horizontal and vertical angular velocities, respectively. Reference designations 263X and 263Y represent analog-to-digital converting circuits which digitize the outputs of the piezoelectric vibrating gyros 233X and 233Y. Reference designations 264X and 264Y represent integrating circuits which integrate the digitized signals after subtracting therefrom the output voltages of the piezoelectric vibrating gyros 233X and 233Y of the stationary state. The sign of the integral value represents the direction of change in angle and the absolute value of the integral value represents the amount of the change in angle. The output of the integrating circuit 264X represents the amount of horizontal rotation of the HMD wearing user's head and the output of the integrating circuit 264Y represents the amount of vertical rotation. The controller 261 determines the amount of variation in viewing direction based on the amounts of the rotations.

Reference designation 265X represents a set of the two photoreflectors 244X and 245X for detecting the amount of rotation of the rotary ball 241 in the X direction. Reference designation 265Y represents a set of the two photoreflectors 244Y and 245Y for detecting the amount of rotation of the rotary ball 241 in the Y direction. The outputs of the photoreflector sets 265X and 265Y are inputted to waveform shaping circuits 266X and 266Y, respectively, and inputted to the controller 261 after the shaping.

Reference designations 231L and 231R are the left and right liquid crystal display panels of the HMD 202. Reference designations 267L and 267R represent LCD driving circuits which drive the liquid crystal display panels 231L and 231R to display left and right images.

Reference designations 251L and 251R represent the left and right CCDs of the three-dimensional camera 201. Reference designations 268L and 268R represent image processing circuits which produce video signals from the outputs of the CCDs 251L and 251R. The video signals produced by the image processing circuits 268L and 268R are inputted to a superimposing circuit 269.

Reference designation 253 represents the inclination sensor provided in the three-dimensional camera 201 for outputting to the controller 261 the vertical angle of shooting of the three-dimensional camera 201 as an electric signal. Reference designation 254 represents the electronic compass which detects the horizontal direction of shooting of the three-dimensional camera and outputs the direction to the controller 261 as an electric signal. The controller 261 incorporates analog-to-digital converting circuits. After digitizing the angle and the direction detected by the inclination sensor 253 and the electronic compass 254, the controller 261 produces an image signal representative of the direction of shooting based on the digitized values.

The superimposing circuit 269 forcedly inserts the image signal representative of the direction of shooting produced by the controller 261 into the video signals from the image processing circuits 268L and 268R and outputs the signals to the LCD driving circuits 267L and 267R. Consequently, an image shot by the three-dimensional camera 201 and information representative of the direction of the image are displayed on the left and right liquid crystal display panels 231L and 231R of the HMD 202.

Reference designation 270 represents a direction setting portion for setting the direction of the three-dimensional camera 201. The direction setting portion 270 includes two stepping motors for driving the three-dimensional camera 201 in the vertical and horizontal directions, respectively, and stepping motor driving circuits. The direction setting portion 270 varies the direction of shooting of the three-dimensional camera 201, and the outputs of the inclination sensor 253 and the electronic compass 254 vary accordingly.

Figure 15:
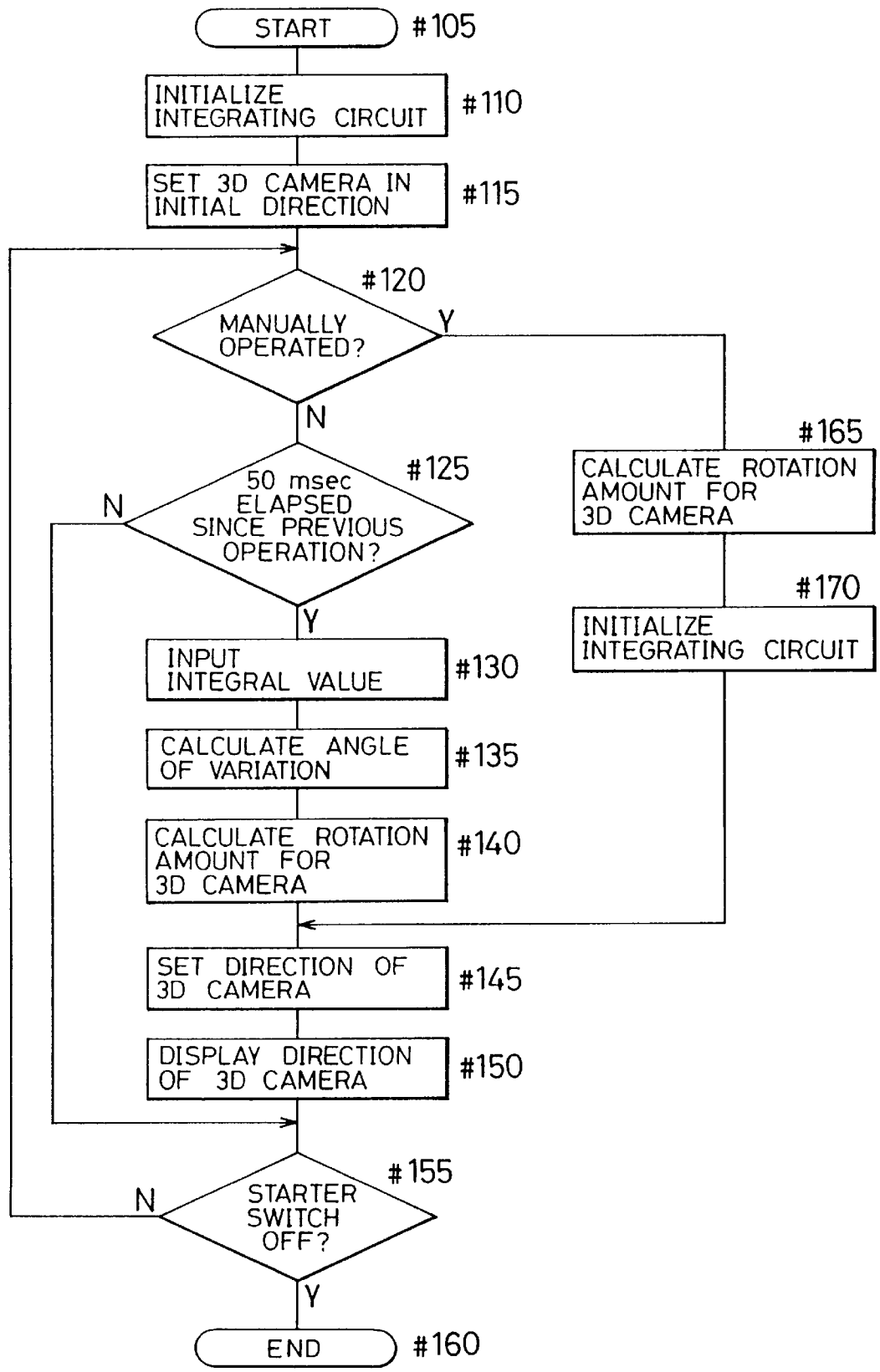
FIG. 15 is a flowchart showing a control process by a controller.

Referring to the flowchart of FIG. 15, there is shown the process of the control performed by the controller 261. When the HMD wearing user turns on the starter switch 227, the controller 261 starts the control (step #105). After the starting, the integrating circuits 264X and 264Y which integrate the outputs of the piezoelectric vibrating gyros are initialized so that the horizontal (X direction) and the vertical (Y direction) integral values are zero (step #110). Then, the three-dimensional camera 201 is set in an initial direction (step #115). Specifically, the output of the inclination sensor 253 incorporated in the three-dimensional camera 201 is monitored and the vertical stepping motor of the position setting portion 270 is driven to shoot the horizontal direction. Also, the output of the electronic compass 254 is monitored and the horizontal stepping motor of the position setting portion 270 is driven to shoot the north.

After the above-described initial setting has been completed, whether the rotary ball 241 of the manual direction setting portion 240 has been operated or not is judged (step #120). When the processing of step #120 is performed for the first time after the starting, only a preparation for the next judgment is made since the rotary ball 241 has not been operated. Specifically, the levels of the signals of the photoreflector sets 265X and 265Y, i.e. photoreflectors 244X, 245X, 244Y and 245Y are stored after being shaped by the waveform shaping circuits 266X and 266Y. When the judgment is made at step #120 at the second and succeeding times, the levels of the signals of the photoreflectors 244X, 245X, 244Y and 245Y at that time and the stored signal levels are compared. When any of the signal levels has been changed, it is judged that the rotary ball 241 has been operated and the signal level at that time is stored. When none of the signal levels has been changed, it is judged that the rotary ball 241 has not been operated.

When it is judged at step #120 that no manual operation has been performed, whether 50 msec have elapsed since the previous manual operation or not is judged (step #125). When 50 msec have not elapsed since the previous operation, it is judged that the rotary ball 241 is being operated. When 50 msec have elapsed, it is judged that the operation has finished.

When the operation has finished, the integral values are obtained by the integrating circuits 264X and 264Y (step #130) and multiplied by a coefficient for converting an integral value into an angle to obtain the angle of variation in direction of viewing (step #135). Then, the driving pulse counts for the horizontal and vertical stepping motors of the direction setting portion 270 corresponding to the detected angle of variation are calculated (step #140) and the direction of the three-dimensional camera 201 is set (step #145). Then, an image showing information representative of the direction of the three-dimensional camera 201 is generated and the image is displayed being superimposed on the taken image (step #150). The information representative of the direction of the camera displayed at this step will be described later in detail. By the processing of steps #130 to #145, the direction of the three-dimensional camera 201 is set in response to the direction of viewing of the user wearing the HMD 202.

Then, the ON/OFF condition of the starter switch 227 is checked to judged whether the continuation of the control is requested or not (step #155). When the switch 227 is maintained on, the process returns to step #120 to continue the control. When the condition of the switch 227 has been changed to off, the control is finished (step #160).

When it is judged at step #125 that 50 msec has not elapsed, the processing of steps #130 to #150 is not performed and the process proceeds directly to step #155. Thus, the setting of direction of the three-dimensional camera 201 in response to the direction of viewing is not performed.

When it is judged at step #120 that the rotary ball 241 has been operated, the direction of rotation and the amount of rotation are obtained for each of the X and the Y directions based on the outputs of the photoreflector sets 265X and 265Y to calculate the amount of driving of the three-dimensional camera 201 (step #165). Specifically, the driving pulse count of the stepping motor of the direction setting portion 270 is calculated so that the angle of the three-dimensional camera 201 changes by 1° for every change of the signals of the photoreflector sets 265X and 265Y. In response to a change of the signal of the photoreflector set 265X, the horizontal angle is changed, whereas in response to a change of the signal of the photoreflector set 265Y, the vertical angle is changed.

Then, the integrating circuits 264X and 264Y are initialized so that the integral values are zero (step #170). Then, the process proceeds to step #145 to set the direction of the three-dimensional camera 201 based on the pulse count calculated at step #165. The succeeding processing is as described previously.

The loop of steps #120 to #155 is performed in a cycle of one to several milliseconds. Consequently, the direction of viewing and the manual setting of the direction are detected in an extremely short cycle. As a result, the displayed image always varies in response to the rotation of the head as well as the rotation of the rotary ball 241.

According to the above-described control processing, when the manual direction setting portion 240 is operated, the direction of the three-dimensional camera 201 is set based on the input from the manual direction setting portion 240 without reference to the direction of viewing of the HMD wearing user. Thus, the manual input has precedence over the direction of viewing and is reflected in the image displayed in the HMD 202. When the manual direction setting portion 240 is not operated, an image of a direction corresponding to the direction of viewing, i.e. the direction of the user's head, is displayed.

When the manual direction setting portion 240 is operated, since the integrating circuits 264X and 264Y are initialized at step #170, the manually inputted direction is used as the reference direction for the viewing direction thereafter. Specifically, in whichever direction the HMD wearing user's head is at the time of operation, the amount of rotation of the head after the operation is reflected to the direction of the three-dimensional camera 201 as a relative variation from the manually set direction. Consequently, disaccordance between the direction of viewing and the direction of shooting, i.e. the direction of the displayed image is permitted.

Figure 16B:
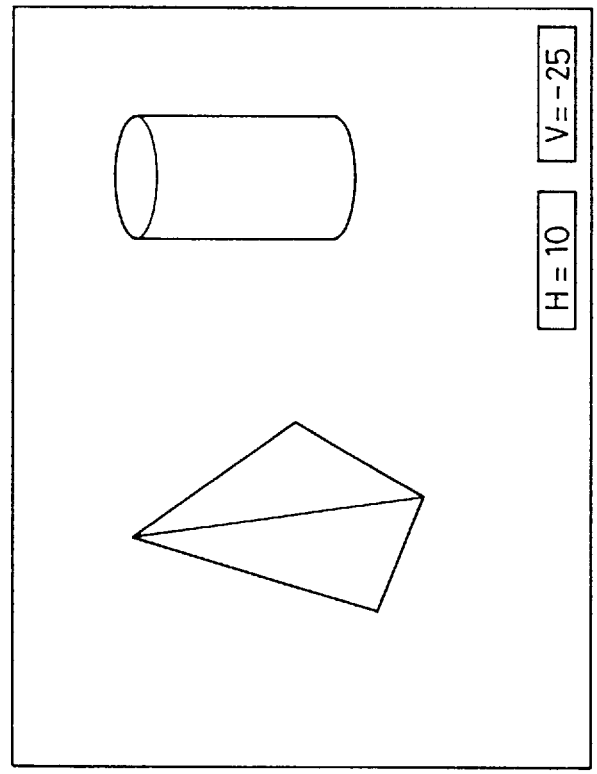
FIGS. 16A and 16B show examples of display of shooting direction information.
Figure 16A:
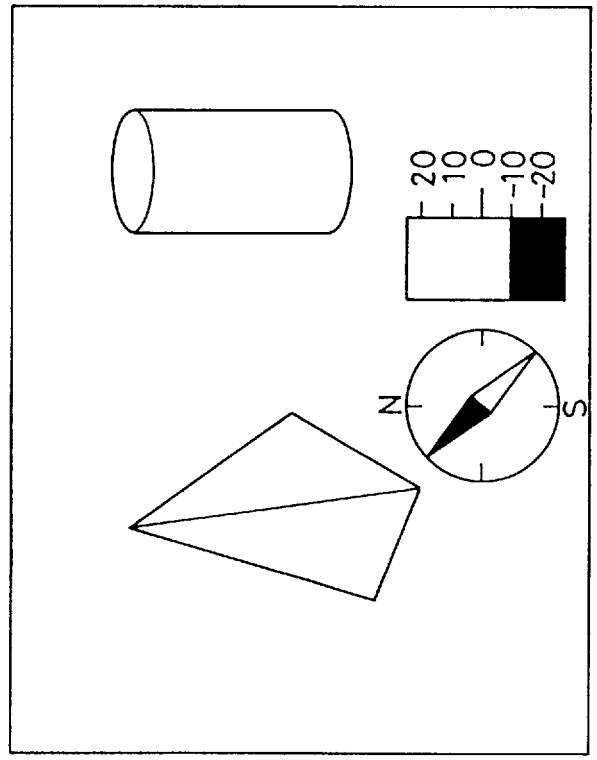

Referring to FIGS. 16A and 16B, there are shown examples of the information representative of the direction of shooting generated by the controller 261 to be displayed together with the taken image. These figures show only one of the left and right images displayed in the liquid crystal display panels 231L and 231R of the HMD 202. The pyramid and the cylinder are images of objects to be viewed which are shot by the three-dimensional camera 201. Here, these images are shot with the three-dimensional camera 201 turned from the reference direction, i.e. the north, to the west by 45° and inclined downward from the initial horizontal direction by 10°. As described previously, as the angle of horizontal rotation of the three-dimensional camera 201, an absolute value with the north as the reference is detected by the electronic compass 254, while as the angle of vertical rotation, an absolute value with the horizontal direction as the reference is detected by the inclination sensor 253.

In FIG. 16A, the detected absolute value of the direction of the camera is graphically shown in a lower part of the image plane. The compass represents that the direction of the three-dimensional camera 201 is the northwest and the bar chart represents that the vertical inclination of the three-dimensional camera 201 is −10° (the dip is 10°).

FIG. 16B shows an image take after the following operations. First the HMD wearing user operated the rotary ball 241 of the manual direction setting portion 240 so that the three-dimensional camera 201 turned horizontally by 55° from the north to the west and turned upward by 15° from the horizontal direction. Then the user rotated his or her head to set the three-dimensional camera 201 in the same direction as that of FIG. 16A. The values shown in this figure are relative values with the manually set direction as the reference and equal the amount of rotation of the head after the manual setting of the direction. For the horizontal rotation (represented by H), the clockwise direction is positive, while for the vertical rotation (represented by V), the upward direction is positive.

Thus, the HMD 202 of the present embodiment is capable of displaying the direction of shooting graphically or numerically and of showing an absolute value or a relative value of the direction of shooting. The HMD 202 has a non-illustrated button for switching among these display methods so that the HMD wearing user may select an arbitrary display by operating the button. Only one of the vertical and the horizontal directions may be displayed as required.

The stereoscopic system of the present embodiment may be used as a monitor for a remotely controlled operation. For example, when a dangerous article is moved, the danger is eliminated by placing the three-dimensional camera 201 at the job site so that the operator wearing the HMD 202 may remotely operate the mechanical equipment for moving the article. In this case, since the information on the direction of the image is displayed in addition to the image of the dangerous article and the equipment, the operator may keep a sense of direction at all times and the operation efficiency increases. In addition, mis-operation is prevented and safety improves.

Furthermore, since the absolute direction of the displayed image and the relative direction to the manually set direction are selectively displayed, the reference direction can be set properly according to the details of the operation. Since the member to be operated in the manual setting is the rotary ball 241 and is provided on the HMD 202, it is possible to operate the member only by the sense of touch without any glance at it. The user can input a direction with his or her eyes fixed on an object to be viewed. Therefore, the direction setting is never an obstacle to the operation.

Figure 17:
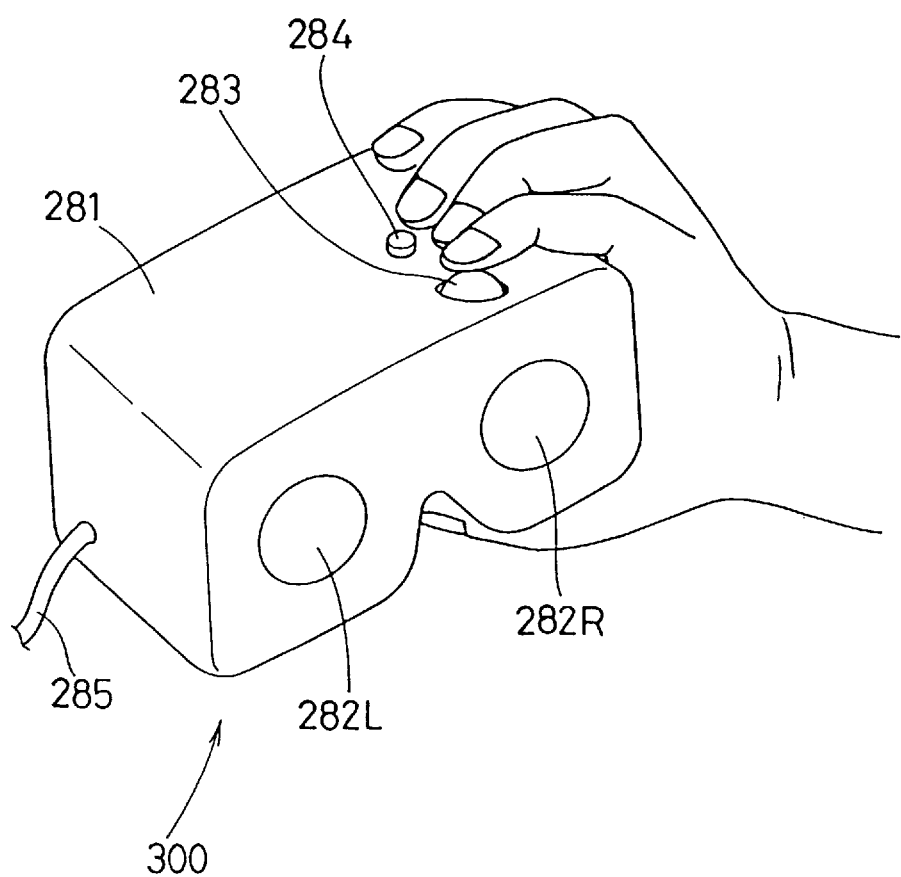
FIG. 17 is an external view of a manually held display apparatus.

When it is unnecessary to freely move both hands, a binocular-type manually held display apparatus 300 as shown in FIG. 17 may be used instead of the HMD 202. Reference designation 281 represents a body cover. Reference designations 282L and 282R represent eyepieces. Reference designation 283 represents a rotary ball. Reference designation 284 represents a starter switch. The members 283 and 284 are disposed on the upper surface of the body cover 281 for convenience of operation. Reference designation 285 is a signal cable connected to the three-dimensional camera. Thus, with the manually held display apparatus 300, the direction of the displayed image can be varied according to the variation in viewing direction and to the manually set direction in quite the same manner as that described previously.

While a camera is used as the means for generating an image in the above-described embodiments, the present invention may be employed in an arrangement where a computer is used for generating an image. In such an arrangement, the HMD 202 or the manually held display apparatus 300 may be connected to an image generating computer to generate an image in accordance with the direction of viewing or the manually inputted direction. Alternatively, an image of a wide area is previously stored so that a partial area is taken out of the image to display in accordance with the direction of viewing or the manually inputted direction.

While the HMD 202 and the manually held display apparatus 300 are structured so that virtual images are viewed through the eyepieces, they may be structured so that the images on the display devices are directly viewed.

Obviously, many modifications and variations of the present invention are possible in light of the above teachings. It is therefore to be understood that within the scope of the appended claims, the invention may be practiced other than as specifically described.

What is claimed is:

1. An image display apparatus worn by a user on the head, comprising:
   an angle sensor for detecting an angle of rotation of the head;
   an angular velocity sensor operable independently of said angle sensor for detecting a velocity of rotation of the head;
   a calculator for calculating an angle of rotation of the head, based on an output from the angle sensor or the angular velocity sensor; and
   a display controller for displaying an image of a direction in accordance with the angle calculated by the calculator.

2. An image display apparatus as claimed in claim 1, further comprising a comparator for comparing a value of the velocity detected by the angular velocity sensor with a predetermined value, wherein the calculator calculates the angle based on a result of the comparison by the comparator.

3. An image display apparatus as claimed in claim 2, wherein the calculator calculates the angle based on the output from the angle sensor when the value detected by the angular velocity sensor is smaller than the predetermined value.

4. An image display apparatus as claimed in claim 2, wherein the calculator calculates the angle based on the output from the angular velocity sensor when the value detected by the angular velocity sensor is greater than the predetermined value.

5. An image display apparatus as claimed in claim 2, wherein the calculator corrects an angle obtained from the output from the angular velocity sensor based on an angle detected by the angle sensor when the value detected by the angular velocity sensor is smaller than the predetermined value.

6. An image display apparatus as claimed in claim 1, further comprising an integrator for integrating the velocity detected by the angular velocity sensor to calculate an angle of rotation.

7. An image display apparatus as claimed in claim 1, further comprising means for judging whether the head of the user is stationary or not, wherein the calculator is provided with a plurality of methods to calculate the angle, said calculator switching the methods based on the result of the judgment.

8. An image display apparatus as claimed in claim 1, further comprising an input device for inputting an image.

9. An image display apparatus as claimed in claim 8, wherein the display controller displays an area, in a direction in accordance with the calculated angle, of the inputted image.

10. An image display apparatus as claimed in claim 8, wherein the input device is a camera.

11. An image display apparatus as claimed in claim 10, wherein the display controller controls the direction of the displayed image by varying a direction of shooting of the camera.

12. An image display apparatus for displaying an image varying in accordance with the direction of the head of a user, comprising:
    a direction detector for detecting a direction of viewing by detecting an angle of rotation of the head;
    an image display controller for displaying an image in accordance with the direction detected by the direction detector;
    an information display controller for displaying information on the direction of viewing;
    a camera for inputting an image, the image display controller controlling a direction of shooting of the camera so that an image in accordance with the detected direction is displayed; and
    a direction setting device operable independently of said direction detector for manually setting the direction of viewing, the information display controller for displaying the information on the detected direction of viewing by representing the information as a direction relative to a direction set by the direction setting device.

13. An image display apparatus as claimed in claim 12, wherein the information display controller displays information on a horizontal direction of viewing.

14. An image display apparatus as claimed in claim 12, wherein the information display controller displays information on a vertical direction of viewing.

15. An image display apparatus comprising:
    an angle sensor for detecting an angle of rotation of a head of a user;
    an angular velocity sensor operable independently of said angle sensor and for detecting a velocity of rotation of the head;
    a calculator for calculating an angle of rotation of the head based on an output from the angular velocity sensor;
    means for comparing the angle of rotation detected by the angle sensor to the calculated angle of rotation so as to determine a correct angle of rotation; and
    a display controller for displaying an image of a direction in accordance with the correct angle of rotation.

16. An image display apparatus for displaying an image varying in accordance with the direction of the head of a user, comprising:
    a display device for displaying an image;
    a direction detector for detecting a direction of viewing by detecting an angle of rotation of the head;
    a direction input device operable independently of said direction detector and for inputting a direction of viewing manually therefrom;
    a selector for selecting one direction out of the directions of viewing detected by the direction detector and inputted from the direction input device;
    an image display controller for displaying on the display device an image in accordance with the direction selected by the selector; and a shooting apparatus directable to the selected direction.

17. An image display apparatus for displaying an image varying in accordance with the direction of the head of a user, comprising:

a display device for displaying an image;

a direction detector for detecting a direction of viewing by detecting an angle of rotation of the head;

a direction input device operable independently of said direction detector and arranged on the display device for inputting a direction of viewing manually therefrom;

a selector for selecting one direction out of the directions of viewing detected by the direction detector and inputted from the direction input device; and an image display controller for displaying on the display device an image in accordance with the direction selected by the selector.

18. An image display apparatus as claimed in claim 12, wherein the information display controller can be switched between a mode in which it represents the detected direction of viewing as a relative direction and mode in which it represents the detected direction of viewing as an absolute direction relative to a predetermined direction.

19. An image display apparatus as claimed in claim 1, wherein the angle sensor and the angular velocity sensor are located separate from each other.

* * * * *